Patented Feb. 26, 1924.

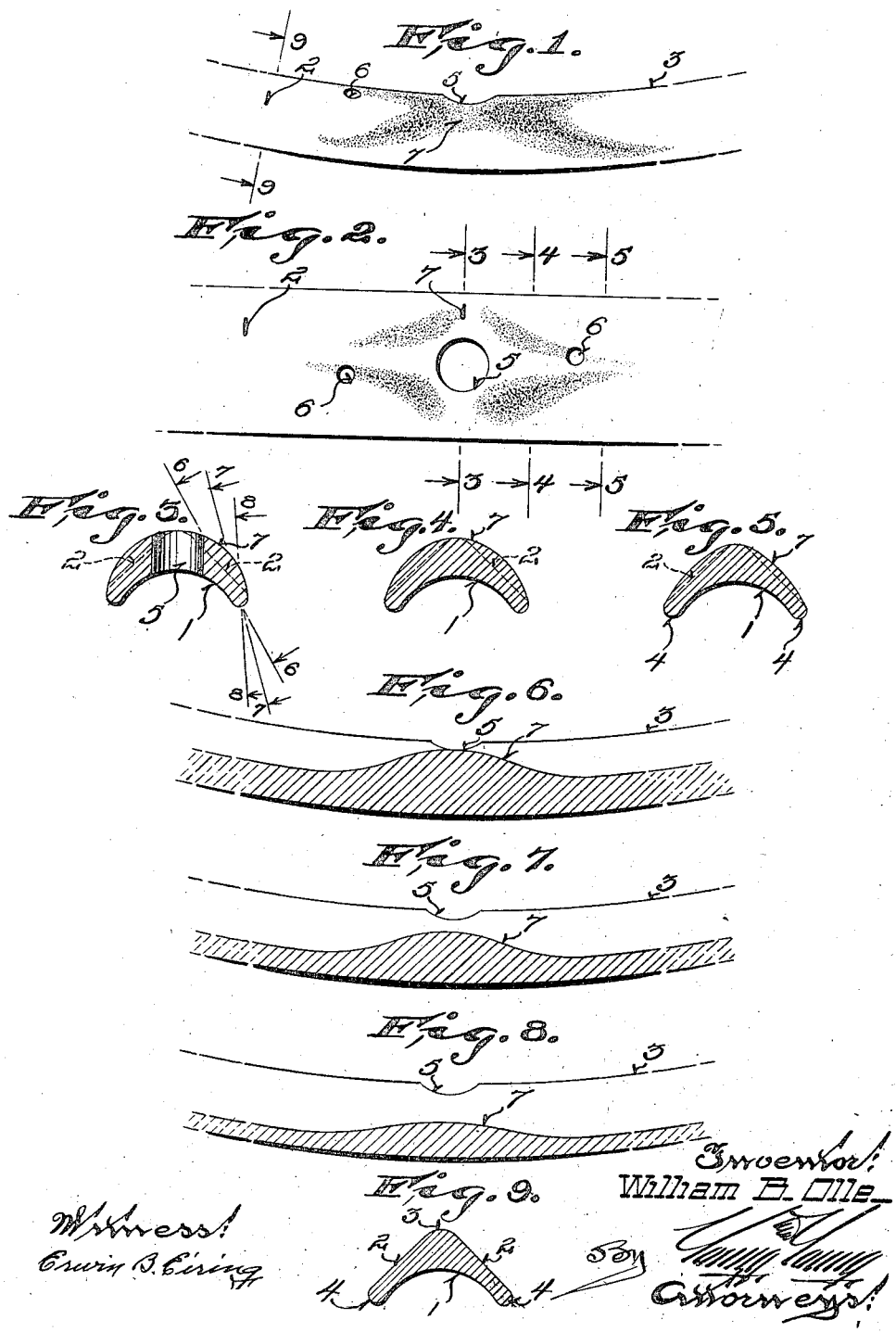

1,484,844

UNITED STATES PATENT OFFICE.

WILLIAM B. OLLE, OF RACINE, WISCONSIN.

METAL BICYCLE-WHEEL RIM.

Application filed July 2, 1923. Serial No. 649,102.

*To all whom it may concern:*

Be it known that I, WILLIAM B. OLLE, a citizen of the United States, and resident of Racine, in the county of Racine and State of Wisconsin, have invented certain new and useful Improvements in Metal Bicycle-Wheel Rims; and I do hereby declare that the following is a full, clear, and exact description thereof.

This invention relates to metal bicycle wheel rims, and is particularly directed to a cast metal rim.

In cast metal rims as previously constructed, considerable difficulty has been experienced in suitably constructing the rim adjacent the aperture for the filling nipple of the tire. It was found that the rims frequently cracked at this point due to its being the weakest portion of the rim. Attempts to reinforce the rim by forming a boss around the hole failed to give satisfactory results, for the internal strains produced during casting caused the rim to soon break when used, adjacent the boss. Further, it was found difficult to prevent the rim from taking an angular set adjacent the boss when cooling, for the boss, being a relatively large mass, stayed hot and kept the adjacent portions of the rim in a plastic condition after the other portions had hardened and shrunk. Consequently, the rim tended to buckle adjacent the boss with consequent distortion.

This invention is designed to overcome the above noted defects, and objects of such invention are to provide a metal bicycle wheel rim which although formed of cast metal and provided with an aperture for the filling nipple, nevertheless is free from any inherent weakness adjacent this point, which is reinforced adjacent the nipple hole, and which, although reinforced by a thickened portion, is free from internal stresses and distortion.

An embodiment of the invention is shown in the accompanying drawing, in which:—

Figure 1 is a fragmentary side view of the portion of the rim adjacent the filling nipple.

Figure 2 is a top plan view of the structure shown in Figure 1.

Figure 3 is a transverse, sectional view on the line 3—3 of Figure 2.

Figure 4 is a sectional view on the line 4—4 of Figure 2.

Figure 5 is a sectional view on the line 5—5 of Figure 2.

Figure 6 is a longitudinal, sectional view on the slanting line 6—6 of Figure 3.

Figure 7 is a corresponding view on the line 7—7 of Figure 3.

Figure 8 is a further corresponding view on the line 8—8 of Figure 3.

Figure 9 is a sectional view on the line 9—9 of Figure 1.

The rim forming the subject matter of this invention is formed of cast metal, preferably aluminum, and is adapted to be used as a bicycle tire rim. It comprises a body portion having a peripheral curved channel 1 adapted to receive its tire and having throughout the major portion of the extent a substantially triangular cross section the base of which is concave and with the thickest portion thereof adjacent the apex, as may be seen from Figure 9. This triangular cross section is secured by converging slanting sides 2 which are joined adjacent their top by a short curved portion 3. The outer edges of the rim are rounded, as indicated at 4, see Figure 9.

The tire rim is provided with a hole 5 for the filling nipple and with a series of holes 6 arranged in staggered relation to each other and adapted to receive the spokes. It, however, is apparent that at the portion where the hole 5 is formed, there is more likelihood of the tire rim breaking than at any other portion, unless such portion is suitably reinforced.

In order to strengthen the rim adjacent the hole 5 it is thickened in a gradual manner. As shown in Figure 3, it will be seen that the upper surface 7 of the rim is rounded transversely at the hole 5 so as to provide a thickened portion having a smooth inner curved surface. It will be seen from Figure 6, which corresponds to the section on the line 6—6 of Figure 3, that the inner surface 7 is also curved longitudinally so that it gradually merges into the flat sides 2 of the main body portion of the rim and that the thickened portion extends a material distance upon each side of the hole 5 so that no abrupt shoulders or changes in curvature or angular portions are formed. This thickened portion along different longitudinal sections gradually fades out and merges into side walls, as may be seen from Figures 7 and 8, which, as stated, are taken on the section lines 7—7 and 8—8 of Figure 5. Thus longitudinally there is no abrupt change of curvature or shoulders, or other angular portions adjacent this thickened portion.

In Figures 3, 4, and 5 the side faces 2 of the main or body portion of the rim are dotted in so that the change in shape may be clearly seen. From Figures 4 and 5 it will be seen that this rounded surface gradually fades out laterally and the curvature at the top portion gradually increases so that the curved surface uniformly approaches the section shown in Figure 9, finally completely fading away and merging into said section.

It has been found that this type of rim is particularly well adapted for bicycles as it provides a rim which may be most readily cast in a simple type of mould and which secures the long desired result of a cast bicycle rim which is adequately strengthened and shaped adjacent the hole for the filling nipple.

When it is considered that the stresses imposed upon a bicycle rim are constantly varying and shifting from point to point and that frequently, as for instance when rough portions of the road are passed over, unusually severe stresses are frequently applied to a relatively localized portion of the rim, it at once becomes apparent that it is imperative that a rim be provided in which there is no sudden change of contour, but which is uniformly strengthened adjacent the openings for the filling nipple so that the stresses are not excessive at any one portion of the rim.

I claim:—

A cast metal bicycle wheel rim comprising a body portion having a uniform peripheral channel upon its outer side for the reception of a tire and having a substantially triangular cross section the base of which is concave and with its apex directed inwardly of the rim and with a thickened central portion, said body portion having a hole for the reception of the tire nipple and having a thickened reinforcing portion adjacent said hole, said thickened reinforcing portion having a rounded inner surface of a maximum thickness approximately equal to that of said thickened central portion, said rounded inner surface gradually merging into the inner surface of said rim, and having a gradually changing curvature longitudinally.

In testimony that I claim the foregoing I have hereunto set my hand at Racine, in the county of Racine and State of Wisconsin.

WILLIAM B. OLLE.